US012244082B2

(12) United States Patent
Roh

(10) Patent No.: US 12,244,082 B2
(45) Date of Patent: Mar. 4, 2025

(54) COVER-TYPE ANTENNA

(71) Applicant: LG INNOTEK CO., LTD., Seoul (KR)

(72) Inventor: Ho Jin Roh, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 68 days.

(21) Appl. No.: 17/911,163

(22) PCT Filed: Dec. 24, 2020

(86) PCT No.: PCT/KR2020/019119

§ 371 (c)(1),
(2) Date: Sep. 13, 2022

(87) PCT Pub. No.: WO2021/187731

PCT Pub. Date: Sep. 23, 2021

(65) Prior Publication Data

US 2023/0103903 A1 Apr. 6, 2023

(30) Foreign Application Priority Data

Mar. 19, 2020 (KR) ........................ 10-2020-0034101

(51) Int. Cl.

*H01Q 9/42* (2006.01)
*H01Q 1/22* (2006.01)
*H01Q 1/44* (2006.01)

(52) U.S. Cl.

CPC ............. *H01Q 9/42* (2013.01); *H01Q 1/2283* (2013.01); *H01Q 1/44* (2013.01); *H01Q 1/2291* (2013.01)

(58) Field of Classification Search

CPC ...... H01Q 1/2283; H01Q 1/2291; H01Q 1/42; H01Q 9/42

See application file for complete search history.

(56) References Cited

U.S. PATENT DOCUMENTS 5,124,733 A 6/1992 Haneishi
2004/0085248 A1* 5/2004 Onaka ...................... H01Q 9/42 343/702
2004/0252064 A1 12/2004 Yuanzhu
2005/0122268 A1 6/2005 Suzuki
2009/0058731 A1 3/2009 Geary et al.

(Continued)

FOREIGN PATENT DOCUMENTS

CN 209516015 U 10/2019
EP 1137097 A1 * 9/2001 ............ H01Q 1/243

(Continued)

*Primary Examiner* — Daniel Munoz

(74) *Attorney, Agent, or Firm* — Birch, Stewart, Kolasch & Birch, LLP

(57) ABSTRACT

An antenna according to one embodiment of the present invention comprises: a first radiation part formed in a cover shape on a first surface of a printed circuit board; and a second radiation part penetrating the printed circuit board from one end of the first radiation part and extending onto a second surface of the printed circuit board, wherein the second radiation part includes a radiation pattern on the second surface of the printed circuit board, and the radiation pattern is spaced apart at a predetermined distance from a grounding pattern formed inside the printed circuit board or on the first surface of the printed circuit board.

19 Claims, 5 Drawing Sheets

(56) References Cited

U.S. PATENT DOCUMENTS

| | | | | |
|---|---|---|---|---|
| 2010/0097272 | A1 | 4/2010 | Kim et al. | |
| 2013/0271346 | A1 | 10/2013 | Dussopt et al. | |
| 2018/0151952 | A1* | 5/2018 | Oh | H01Q 9/42 |

FOREIGN PATENT DOCUMENTS

| | | | |
|---|---|---|---|
| JP | 2005-167900 | A | 6/2005 |
| JP | 2007-259412 | A | 10/2007 |
| JP | 5549800 | B2 | 7/2014 |
| JP | 2017-11244 | A | 1/2017 |
| JP | 2019-186824 | A | 10/2019 |
| KR | 10-2008-0078149 | A | 8/2008 |
| KR | 10-2010-0074450 | A | 7/2010 |
| KR | 10-2015-0072634 | A | 6/2015 |

* cited by examiner

COVER-TYPE ANTENNA

CROSS REFERENCE TO RELATED APPLICATIONS

This application is the National Phase of PCT/KR2020/019119 filed on Dec. 24, 2020, which claims priority under 35 U.S.C. § 119 (a) to Patent Application No. 10-2020-0034101 filed in the Republic of Korea on Mar. 19, 2020, all of which are hereby expressly incorporated by reference into the present application.

TECHNICAL FIELD

The present invention relates to an antenna, and more particularly, to a cover-type antenna including a capacitance auxiliary pattern.

BACKGROUND ART

When configuring a general antenna, the length should be designed to be ¼ of the wavelength. For example, for the 2.4 GHz frequency, the line length of an antenna needs to have approximately 32 mm considering the wavelength. In addition, a certain distance from the ground (GND) is also required. In the case of a small antenna required for a small communication module for a near field communication, the antenna should also be configured to have a small size according to the miniaturization.

Conventional products adjust the line length with a PCB pattern, apply a chassis-type antenna with a large size, or use a chip antenna. Each of these has a problem that it is not suitable for miniaturization, and in particular, in the case of a chip antenna, there is a disadvantage in terms of cost.

DETAILED DESCRIPTION OF THE INVENTION

Technical Subject

The technical problem to be solved by the present invention is to provide a cover-type antenna including a capacitance auxiliary pattern specifically.

The problems of the present invention are not limited to the problems mentioned above, and other problems not mentioned will be clearly understood by those skilled in the art from the following description.

Technical Solution

In order to solve the above technical problem, an antenna according to an embodiment of the present invention comprises: a first radiation part formed in a cover shape on a first surface of a printed circuit board; and a second radiation part penetrating the printed circuit board from one end of the first radiation part and extending onto a second surface of the printed circuit board, wherein the second radiation part includes a radiation pattern on the second surface of the printed circuit board, and the radiation pattern is spaced apart as much as a predetermined distance from the first surface of the printed circuit board or the grounding pattern being formed inside the printed circuit board.

In addition, the printed circuit board may include a plurality of layers, wherein the ground pattern may be formed on one layer among the plurality of layers.

In addition, the printed circuit board may include a plurality of layers, wherein a ground may not be formed between the radiation pattern and the ground pattern.

In addition, the radiation pattern may be capacitance coupled to the ground pattern.

In addition, the frequency of the radiation signal may vary according to the distance between the radiation pattern and the ground pattern.

In addition, the frequency of the radiation signal may vary according to the length of the radiation pattern.

In addition, the second radiation part may include a connection part connected to a radiation part of another board on which the antenna is mounted.

In addition, a ground may not be formed in a radiation direction of the radiation pattern in another board on which the antenna is mounted.

In addition, the first radiation part may include: a feed part receiving a signal from the printed circuit board; and a ground part connected to the ground of the printed circuit board.

In addition, the first radiation part may include one or more support parts being soldered on the printed circuit board and supporting the first radiation part.

In addition, a ground may not be formed between the lower portion of the support part and the second surface of the printed circuit board.

Advantageous Effects

According to the embodiments of the present invention, by designing a commonly used shield can portion as an antenna, it is possible to reduce the area for a separate antenna design, miniaturize it, and reduce costs. In addition, it is possible to optimize the antenna through the capacitance patterning signal line to maximize the radiation effect and fine tuning in the resonance point design. Furthermore, it is possible to insert an additional auxiliary pattern into an application board using an additional module, so that it becomes a structure in which fine tuning can be performed even in various stacking and dielectric constant environments of various types of application PCBs.

Through this, it is possible to implement an ultra-small chassis antenna integrated module, increase efficiency with additional auxiliary patterns for antenna length and performance, and easily debug and supplement the resonance point that is changed by the environment of various applications, that is, equipment, metal, body, PCB stacking, dielectric constant, and the like.

Effects according to the invention are not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Figure 1:
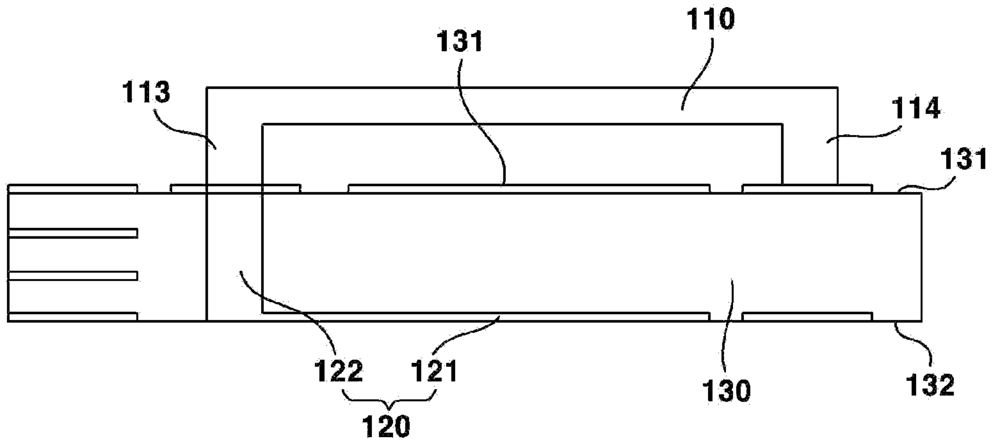
FIG. 1 is a diagram illustrating an antenna according to an embodiment of the present invention.

FIG. 1 is a diagram illustrating an antenna according to an embodiment of the present invention.

An antenna according to an embodiment of the present invention includes a first radiation part 110 and a second radiation part 120.

The first radiation part 110 is formed in the form of a cover on the first surface 131 of the printed circuit board 130.

More specifically, the first radiation part 110 is formed in a shape covering the printed circuit board 130 at an upper portion of the printed circuit board 130 and radiates a signal to the outside. Here, the printed circuit board 130 may be a system in package (SIP) communication module, and may be a near field wireless communication module such as Bluetooth, Bluetooth Low Energy (BLE), and Wi-Fi. In addition, it is natural that various communication modules may be used. As a module for performing a near field wireless communication, it may be a small communication module. The first radiation part 110 serves as a shield cover protecting the printed circuit board 130 and emitting a signal at the same time. To this end, the first radiation part 110 may be formed of a metal. By being formed of metal, it is possible to protect the printed circuit board 130 and radiate a signal at the same time.

Figure 2:
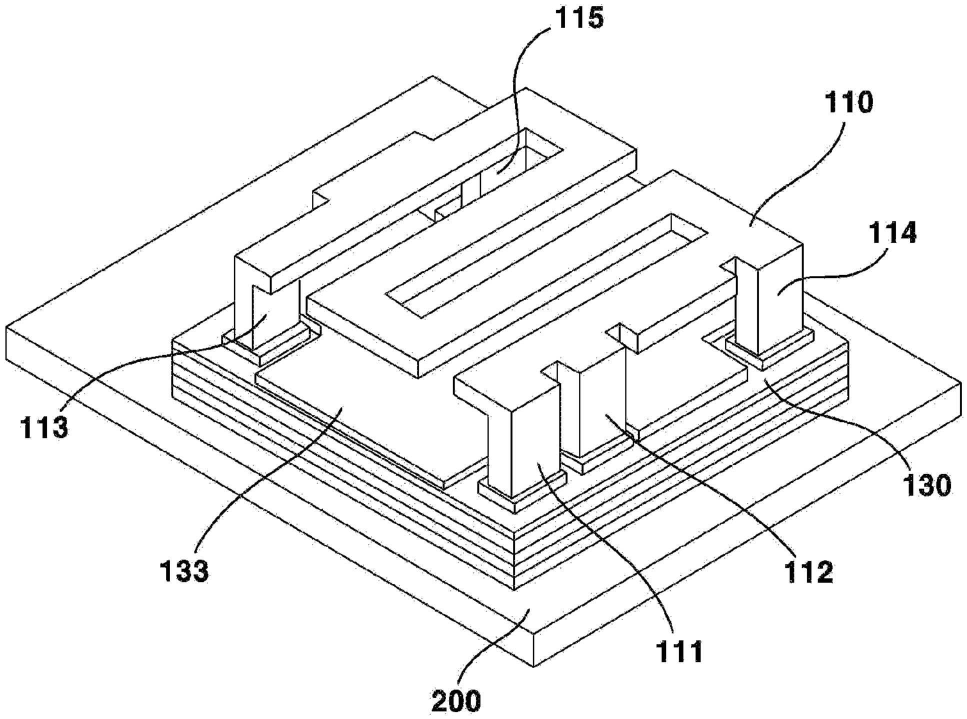
FIG. 2 is a diagram illustrating that an antenna according to an embodiment of the present invention is mounted on another board.

The first radiation part 110 is spaced apart from the first surface 131 of the printed circuit board 130 at a predetermined distance to be formed in the shape of a cover to cover the first surface 131 of the printed circuit board 130. The first radiation part 110 may include a feed part 111 receiving a signal from the printed circuit board 130 for radiation of a signal and a ground part 112 being connected to the ground of the printed circuit board 130. As a current is applied through the feed part 111, a signal is inputted, and the current applied to the ground part 112 exits, but as shown in FIG. 2, the signal is radiated through the first radiation part 110 formed in a meander shape or the like.

The first radiation part 110 may include one or more support parts 113, 114, and 115 that are soldered on the printed circuit board 130 to support the first radiation part 110 in order to maintain the shape of the cover. The support part 113 among the support parts 113, 114, and 115 is connected to the second radiation part 120, which will be described later, the other support parts 114 and 115 are connected to the printed circuit board 130 by soldering, and may be formed to be insulated without being connected to a ground or other components.

The first radiation part 110 is formed in the form of a cover of the printed circuit board 130 so that it can simultaneously perform the role of the cover of the printed circuit board and the role of radiation, through this, since it does not require a structure for separate radiation for signal radiation it is advantageous for miniaturization. In addition, when forming a radiation part, there is a spatial constraint that other components must not be disposed within a predetermined interval so that the other components do not affect radiation, and by implementing the radiation part in the form of a cover of the printed circuit board 130, the spatial constraint can be reduced, thereby possibly increasing the degree of freedom in design.

The second radiation part 120 is extended from one end 113 of the first radiation part 110 to the second surface 132 of the printed circuit board 130 through the printed circuit board 130.

More specifically, the second radiation part 120 is being extended from the first radiation part 110, and formed by penetrating the printed circuit board 130 and being extended to the second surface 132 of the printed circuit board 130. The second radiation part 120 may be formed by being extended from one support part 113 among the support parts 113, 114, and 115 of the first radiation part 110 described above.

The second radiation part 120 may include a penetrating part 122 penetrating through the printed circuit board 130 and a radiation pattern 121 formed on the second surface of the printed circuit board 130. The second radiation part 120 is electrically connected to the first radiation part 110, and the current applied to the first radiation part 110 also flows to the second radiation part 120, thereby performing the role of emitting a signal. Through this, radiation is accomplished in both the first radiation part 110 and the second radiation part 120. The first radiation part 110 is formed on the first surface 131 of the printed circuit board 130, and the second radiation part 120 is formed on the second surface 132 of the printed circuit board 130, thereby accomplishing bidirectional radiation of the first radiation part 110 and the second radiation part 120. Through the bidirectional radiation, radiation efficiency can be increased, and the directivity of radiation can be increased, so that radiation efficiency can be increased even in an environment where radiation space is restricted.

The first radiation part 110 is formed in the form of a cover of the printed circuit board 130, and the length of the radiation part that can be implemented as the first radiation part 110 is limited according to the size of the printed circuit board 130. As shown in FIG. 2, even when a pattern is formed in a meander shape, the total length of the radiation part is limited according to the area constraint. The second radiation part 120 is connected to the first radiation part 110 and being extended penetrating through the printed circuit board 130, thereby extending the total length of the radiation part and possibly resolving the length constraint. The second radiation part 120 is implemented as the length of the penetrating part 122 penetrating the printed circuit board 130, that is, the thickness of the printed circuit board 130 and the length of the radiation pattern 121 being formed on the second surface 132 of the printed circuit board 130 so that the length of the entire radiation part may be secured as much as the length of the second radiation part 120. The frequency of the radiation signal may vary according to the length of the radiation pattern 121. The frequency of the radiation signal is affected by the total length of the radiation part. The length of the first radiation part 110 is difficult to adjust due to spatial constraints and the radiation pattern 121 is easy to adjust in length, so the length of the radiation pattern 121 whose length can be adjusted according to the design and according to the frequency of the signal to be radiated can be adjusted.

In addition, the radiation pattern 121 is formed on the second surface 132 of the printed circuit board 130, and may be formed to be spaced apart by a predetermined distance from the first surface 131 of the printed circuit board 130 or the ground pattern 133 being formed inside the printed circuit board 130. Since the radiation pattern 121 is formed to be spaced apart from the ground pattern 133 by a predetermined distance, the radiation pattern 121 and the ground pattern 133 may form a capacitance coupling. The frequency of the radiation signal varies depending on the resonance point of the radiation part, and the resonance point of the radiation part is affected by the inductance component and the capacitance component formed in the radiation part. The radiation pattern 121 forms a capacitance coupling with the ground pattern 133 so that the resonance point can be adjusted. Since the capacitance is affected by the distance and area of the two patterns, the frequency of the radiation signal may vary according to the distance between the radiation pattern 121 and the ground pattern 133.

The ground pattern 133 may be formed on or inside the first surface 131 of the printed circuit board 130. Here, the ground pattern 133 may be a pattern connected to a ground being formed to correspond to the radiation pattern 121. It is natural that the ground pattern 133 may be formed to correspond to the shape of the radiation pattern 121 or may be formed in the form of a wide plate, and may be formed in various other forms.

When the ground pattern 133 is formed on the first surface 131 of the printed circuit board 130, the printed circuit board 130 may be formed to have a predetermined thickness, and since the radiation pattern 121 is formed on the second surface 132 of the printed circuit board 130, the radiation pattern 121 and the ground pattern 133 may be formed to be spaced apart as much as the thickness of the printed circuit board 130. That is, the frequency of the radiation signal may vary according to the thickness of the printed circuit board 130.

The ground pattern 133 may be formed inside the printed circuit board 130 not on the first surface 131 of the printed circuit board 130. At this time, the printed circuit board 130 includes a plurality of layers, and the ground pattern may be formed on one layer among the plurality of layers. The printed circuit board 130 may be formed by stacking a plurality of printed circuit boards comprising a plurality of layers not a single printed circuit board and the ground pattern 133 may be formed on one layer among the plurality of layers. When the ground pattern 133 is formed on the uppermost layer of the printed circuit board 130, since the uppermost layer of the printed circuit board 130 corresponds to the first surface of the printed circuit board 130, and printed, it can be said that the ground pattern 133 is formed on the first surface 131 of the circuit board 130.

When the printed circuit board 130 is formed of a plurality of layers, a ground may not be formed between the radiation pattern 121 and the ground pattern 133. The radiation pattern 121 and the ground pattern 133 are spaced apart from each other and capacitance coupled, and since the capacitance coupling of the radiation pattern 121 and the ground pattern 133 is affected when a ground is formed between the radiation pattern 121 and the ground pattern 133, a ground may not be formed in the corresponding region in the layer positioned between the radiation pattern 121 and the ground pattern 133 in order to increase the accuracy in designing the resonance point and the radiation efficiency. A corresponding space may be left open without forming other components such as signal lines other than the ground. For example, as shown in FIG. 1, the printed circuit board 130 is formed in four layers, the radiation pattern 121 is formed on the second surface 132 of the printed circuit board 130, and the ground may not be formed in the corresponding regions of the second and third layers when the ground pattern 133 is formed on the first surface 131 of the printed circuit board 130, that is, the fourth layer.

Figure 3:
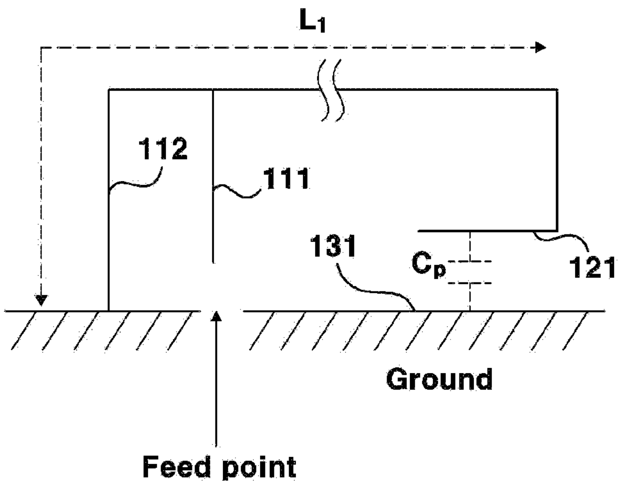
FIGS. 3 to 9 are diagrams for explaining an antenna according to an embodiment of the present invention.

As described above, the first radiation part 110 being formed and the second radiation part 120 being extended from the first radiation part 110 may be expressed as an equivalent circuit, as shown in FIG. 3. The entire radiation part is connected to the feed part 111 and the ground part 112. When only the first radiation part 110 is formed, there is a limit of a length that can be physically implemented in the total length L1 of the first radiation part 110. For example, if the length required for L1 is 32 mm for signal radiation, even if it is designed in a meander shape within the 6×4 mm module space, which is the area of the cover of the printed circuit board 130, only a length of about 18 mm, which is half the length, can be implemented, therefore it is difficult to realize the desired frequency of the radiation signal. However, the length of L1 can be extended to implement the desired frequency of the radiation signal by connecting the second radiation part 120, and also, it is possible to design a resonance point due to the capacitance component along with the extension of the length of the radiation part by including the radiation pattern 121 which is capacitance coupled with the ground pattern 133, and an improvement in radiation efficiency performance can be expected.

As described above, one or more support parts 113, 114, and 115 are formed in the first radiation part 110, and when a ground is formed at a lower portion of the support parts 114 and 115 that are not connected to the second radiation part 120, capacitance coupling may be accomplished by the support parts 114 and 115 and the ground at the lower portion thereof. It is possible to adjust the resonance point by using the capacitance coupling made by the support parts 114 and 115, or, conversely, the resonance point control using capacitance coupling may be implemented in the radiation pattern 121, and the influence of the capacitance coupling may be minimized in the support parts 114 and 115. To this end, a ground may not be formed between the lower portions of the support parts 114 and 115 and the second surface 132 of the printed circuit board 130. By not forming a ground between the lower portion of the support parts 114 and 115 and the second surface 132 of the printed circuit board 130, it is possible to fix the capacitance coupling generated by the support parts 114 and 115, and it may be easy to adjust the resonance point using the radiation pattern 121.

Figure 4:
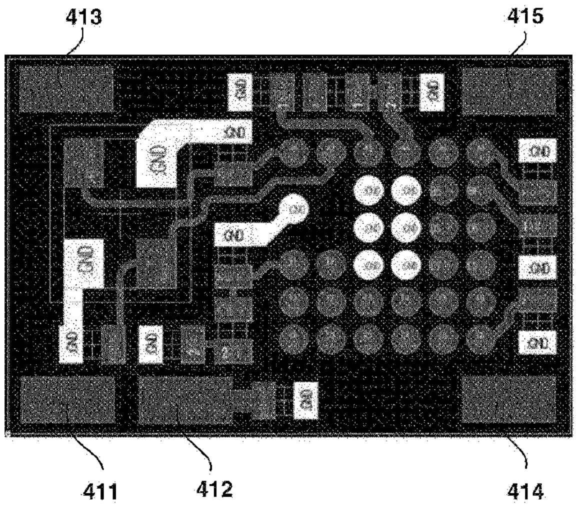
Figure 5:
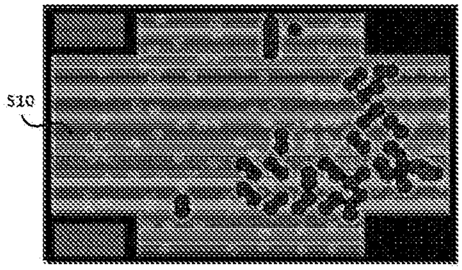
Figure 6:
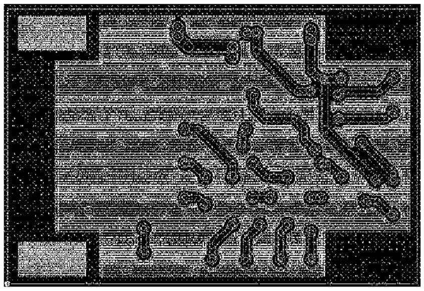
Figure 7:
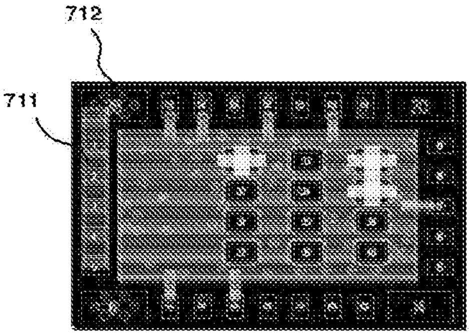

When the printed circuit board 130 is formed of a plurality of layers, for example, when it is formed of four layers, each layer may be implemented as shown in FIGS. 4 to 7. As shown in FIG. 4, components necessary for the communication module may be formed on the first surface 131, that is, the fourth layer of the printed circuit board 130 on which the first radiation part 110 is formed. In addition, a feed terminal 411 being connected to the first radiation part 110 and the feed part 111 and a ground terminal 412 being connected to the ground part 112 are formed; regions 414 and 415 to which the support parts 114 and 115 are soldered are formed; and a region 413 to which the first radiation part 110 and the second radiation part 120 are connected may be formed. In the third and second layers, as shown in FIGS. 5 and 6, through holes penetrating the layers may be formed. As shown in FIG. 7, on the second surface 132 of the first layer, that is, the printed circuit board 130, the components necessary for the communication module are formed; and a penetrating part 713 and a radiation pattern 721 of the second radiation part 120 may be formed. The radiation pattern 121 may be capacitance coupled with the ground pattern 510 being formed in the third layer, as shown in FIG. 5, and a ground may not be formed on the second layer between the first and third layers as shown in FIG. 6.

The antenna formed as described above may be mounted on the application board 200 as shown in FIG. 2 and operate as a communication module. At this time, the second radiation part 120 may include a connection part being connected to the radiation parts 201 and 202 of another board 200 on which the antenna is mounted. The second radiation part 120 does not end the total length of the radiation part in its radiation pattern 121, and may form a connection part that can be connected to the radiation parts 201 and 202 being formed on the corresponding board 200 so that the total length of the radiation part can be extended in another board 200 on which the antenna is mounted. When the antenna is mounted on the application board 200, the radiation characteristics of the antenna may be affected according to the characteristics of the application board 200. Accordingly, a connection part may be provided so that the radiation characteristics can be finely adjusted according to the characteristics of the application board 200.

Figure 8:
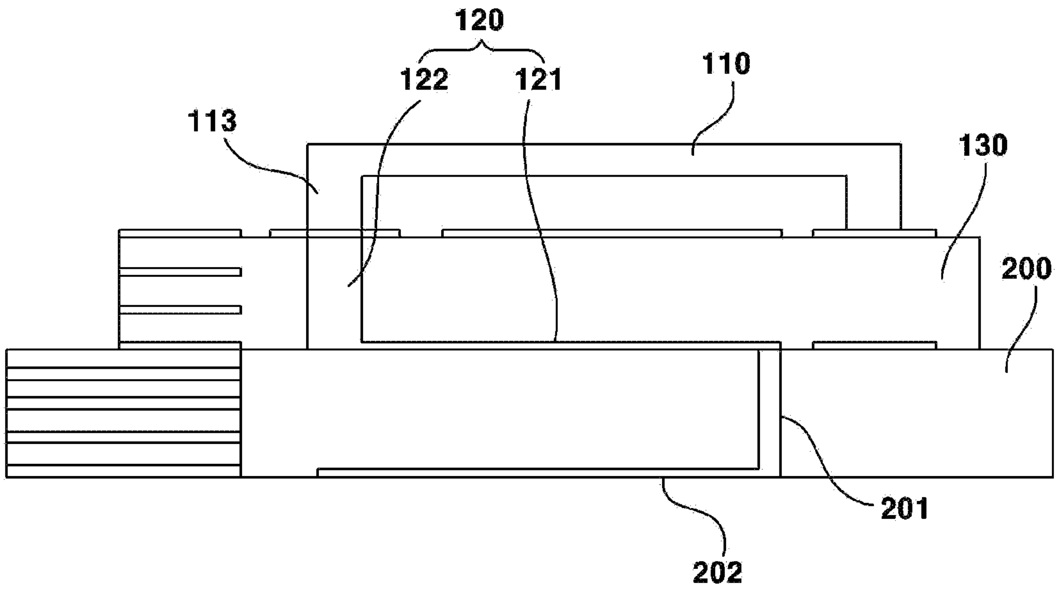

The radiation parts 201 and 202 of the application board may be connected to the second radiation part 120 as shown in FIG. 8. The radiation part of the application board may include a penetrating part 201 and a radiation pattern 202 penetrating the application board. The radiation pattern 202 of the application board may be capacitance coupled to the ground pattern 133, and radiation characteristics may be adjusted according to the shape of the radiation pattern 202 of the application board.

Figure 9:
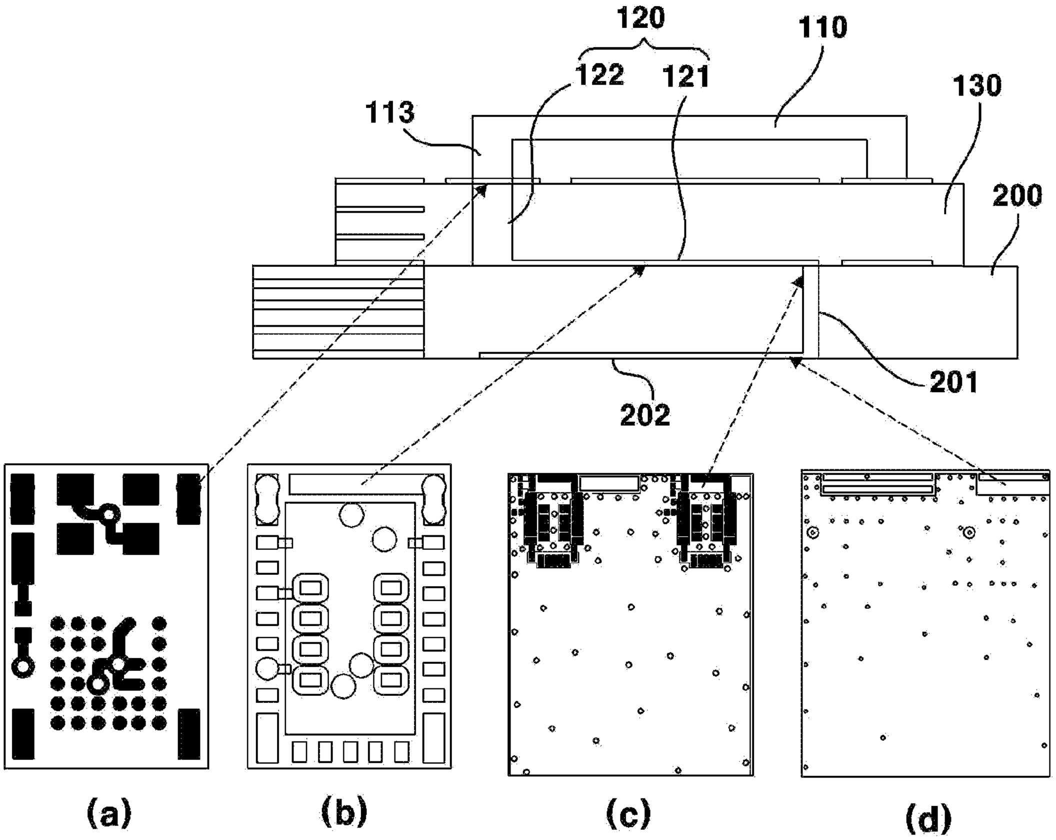

The shape of the printed circuit board of the antenna connected up to the radiation part of the application may be implemented as shown in FIG. 9. The first radiation part 110 is connected to the second radiation part 120 penetrating through the first surface 131 of the printed circuit board 130, as shown in FIG. 9(*a*), and the radiation pattern 121 of the second radiation part 120 is formed on the second surface of the printed circuit board 130, as shown in FIG. 9(*b*). The radiation part of the application board is connected to the radiation pattern of the second radiation part 120, as shown in FIG. 9(*c*), and the radiation part of the application board penetrates through the application board and a radiation pattern may be formed on the other surface as shown in FIG. 9(*d*). Through this, it may be easy to adjust the radiation characteristics.

When the antenna is mounted on the application board, since the application board is positioned in the radiation direction of the second radiation part 120, the radiation of the second radiation part 120 may be affected by the configuration of the application board. Accordingly, in order to increase the radiation efficiency of the second radiation part 120, a ground may not be formed in a radiation direction of the radiation pattern in another board on which the antenna is mounted.

Through this, additional auxiliary patterns can be implemented on the application board, so that fine tuning of the radiation characteristics of the printed circuit boards constituting various types of application boards is possible even in various stacking and dielectric constant environments. Accordingly, the resonance points being varied by the application environments, that is, equipment, metal, human body, stacking of PCBs, dielectric constant, and the like, to be variously applied can be easily debug and supplemented As described above, the present invention has been described with specific matters such as specific configurational elements and limited embodiments and drawings, but these are only provided to help a more general understanding of the present invention, and the present invention is not limited to the above embodiments, and those of ordinary skill in the art to which the present invention belongs can make various modifications and variations of the position measuring unit from such a description.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. An antenna comprising:

a first radiation part formed in a cover shape on a first surface of a printed circuit board; and a second radiation part penetrating the printed circuit board from one end of the first radiation part and extending onto a second surface of the printed circuit board, wherein the second radiation part comprises a radiation pattern on the second surface of the printed circuit board, wherein the radiation pattern is spaced apart as much as a predetermined distance from the first surface of the printed circuit board or a ground pattern formed inside the printed circuit board, wherein a first part of the first radiation part is spaced apart from the first surface of the printed circuit board at a predetermined distance to cover the first surface of the printed circuit board, and wherein a second part of the first radiation part contacts the first surface of the printed circuit board to space the first part of the first radiation part from the first surface of the printed circuit board.

2. The antenna according to claim 1, wherein the printed circuit board comprises a plurality of layers, and wherein the ground pattern is formed on one layer among the plurality of layers.

3. The antenna according to claim 1, wherein the printed circuit board comprises a plurality of layers, and wherein a ground is not formed between the radiation pattern and the ground pattern.

4. The antenna according to claim 1, wherein the radiation pattern is capacitance-coupled to the ground pattern.

5. The antenna according to claim 1, wherein a frequency of the radiation signal varies according to the distance between the radiation pattern and the ground pattern.

6. The antenna according to claim 1, wherein a frequency of the radiation signal varies according to a length of the radiation pattern.

7. The antenna according to claim 1, wherein the second radiation part comprises:

a connection part connected to a radiation part of another board on which the antenna is mounted.

8. The antenna according to claim 1, wherein a ground is not formed in a radiation direction of the radiation pattern in another board on which the antenna is mounted.

9. The antenna according to claim 1, wherein the first radiation part comprises:

a feed part receiving a signal from the printed circuit board; and a ground part connected to a ground of the printed circuit board.

10. The antenna according to claim 1, wherein a ground is not formed between a lower portion of the support part and the second surface of the printed circuit board.

11. The antenna according to claim 7, wherein the another board comprises an application board.

12. The antenna according to claim 1, wherein the first radiation part is formed in a meander shape.

13. A communication module comprising:

a printed circuit board;

a first radiation part formed in a cover shape on a first surface of the printed circuit board; and a second radiation part penetrating the printed circuit board from one end of the first radiation part and extending onto a second surface of the printed circuit board, wherein the second radiation part comprises a radiation pattern on the second surface of the printed circuit board, and wherein the radiation pattern is spaced apart as much as a predetermined distance from the first surface of the printed circuit board or a ground pattern formed inside the printed circuit board, wherein a first part of the first radiation part is spaced apart from the first surface of the printed circuit board at a predetermined distance to cover the first surface of the printed circuit board, and wherein a second part of the first radiation part contacts the first surface of the printed circuit board to space the first part of the first radiation part from the first surface of the printed circuit board.

14. The communication module according to claim 13, wherein the printed circuit board comprises a plurality of layers, and wherein the ground pattern is formed on one layer among the plurality of layers.

15. The communication module according to claim 13, wherein the printed circuit board comprises a plurality of layers, and wherein a ground is not formed between the radiation pattern and the ground pattern.

16. The communication module according to claim 13, wherein the radiation pattern is capacitance-coupled to the ground pattern.

17. The communication module according to claim 13, wherein a frequency of the radiation signal varies according to the distance between the radiation pattern and the ground pattern.

18. The communication module according to claim 13, wherein a frequency of the radiation signal varies according to a length of the radiation pattern.

19. The communication module according to claim 13, wherein the second radiation part comprises:

a connection part connected to a radiation part of another board on which the antenna is mounted.

* * * * *